US012531377B2

(12) United States Patent
Cao et al.

(10) Patent No.: US 12,531,377 B2
(45) Date of Patent: Jan. 20, 2026

(54) HIGH SPEED ELECTRICAL CONNECTOR

(71) Applicant: Amphenol Commercial Products (Chengdu) Co., Ltd., Chengdu (CN)

(72) Inventors: Teng Cao, Chengdu (CN); Xiaodong Hu, Chengdu (CN); Lei Liao, Shenzhen (CN)

(73) Assignee: Amphenol Commercial Products (Chengdu) Co., Ltd., Chengdu (CN)

( * ) Notice: Subject to any disclaimer, the term of this patent is extended or adjusted under 35 U.S.C. 154(b) by 399 days.

(21) Appl. No.: 18/097,805

(22) Filed: Jan. 17, 2023

(65) Prior Publication Data

US 2024/0079827 A1 Mar. 7, 2024

(30) Foreign Application Priority Data

Sep. 2, 2022 (CN) ......................... 202222336962.7

(51) Int. Cl.
*H01R 13/64* (2006.01)
*H01R 13/405* (2006.01)
(Continued)

(52) U.S. Cl.
CPC ....... *H01R 13/6471* (2013.01); *H01R 13/405* (2013.01); *H01R 13/516* (2013.01); *H01R 13/629* (2013.01)

(58) Field of Classification Search
CPC .. H01R 12/727; H01R 13/113; H01R 12/724; H01R 13/11; H01R 13/4223;
(Continued)

(56) References Cited

U.S. PATENT DOCUMENTS 4,286,837 A * 9/1981 Yasutake .............. H01R 43/205 439/82
5,147,218 A * 9/1992 Matthews ............ H01R 4/2429 439/651
(Continued)

FOREIGN PATENT DOCUMENTS

CN 2840353 Y 11/2006
CN 202585857 U 12/2012
(Continued)

OTHER PUBLICATIONS

[No Author Listed], SFF Committee SFF-8639 Specification for Multifunction 6X Unshielded Connector. Rev 2.1. Development. SNIA SFF TWG Technology Affiliate. May 26, 2017. 32 pages.
(Continued)

*Primary Examiner* — Truc T Nguyen
(74) *Attorney, Agent, or Firm* — Wolf, Greenfield & Sacks, P.C.

(57) ABSTRACT

A connector for use with high-speed signals. The connector includes a connector subassembly that includes conductive elements held in a row by an insulative member. Each conductive element includes a mating end, a mounting end opposite the mating end, and an intermediate portion extending therebetween. The conductive elements include ground conductors dispersed between pairs of signal conductors. The ground conductors are wider than the signal conductors at the intermediate portions, and have same widths as the signal conductors at the ends. For each ground conductor, the intermediate portion has first and second portions separated by a slot until joining each other at the mating end. The insulative member holds the conductive elements at least partially through the slots of the ground conductors. Such a configuration meets signal integrity requirements in connec-
(Continued)

tors designed for 64 Gbps and beyond, while conforming to a standard that constrains mating and mounting interfaces.

17 Claims, 12 Drawing Sheets

(51) Int. Cl.
*H01R 13/516* (2006.01)
*H01R 13/629* (2006.01)
*H01R 13/6471* (2011.01)

(58) Field of Classification Search
CPC ..... H01R 43/16; H01R 13/111; H01R 13/112; H01R 13/28; H01R 13/04
See application file for complete search history.

(56) References Cited

U.S. PATENT DOCUMENTS

| | | | | |
|---|---|---|---|---|
| 6,648,657 | B1 * | 11/2003 | Korsunsky | H01R 13/6594 439/108 |
| 7,335,063 | B2 | 2/2008 | Cohen et al. | |
| 7,581,990 | B2 | 9/2009 | Kirk et al. | |
| 8,462,502 | B2 | 6/2013 | Hirano et al. | |
| 8,585,440 | B2 | 11/2013 | Jiang et al. | |
| 8,657,627 | B2 | 2/2014 | McNamara et al. | |
| 8,702,451 | B2 | 4/2014 | Luo et al. | |
| 8,740,631 | B2 | 6/2014 | Chen | |
| 9,225,090 | B2 | 12/2015 | Chen | |
| 9,407,022 | B1 | 8/2016 | Wang | |
| 9,564,714 | B1 | 2/2017 | Wang et al. | |
| 9,831,605 | B2 | 11/2017 | Buck et al. | |
| 9,941,641 | B1 | 4/2018 | Jiang et al. | |
| 9,985,391 | B1 | 5/2018 | Wang | |
| 10,283,910 | B1 | 5/2019 | Chen et al. | |
| 10,411,376 | B1 | 9/2019 | Wang et al. | |
| 10,468,829 | B2 * | 11/2019 | Zerebilov | H01R 13/6586 |
| 10,651,589 | B1 | 5/2020 | Wang et al. | |
| 10,763,608 | B1 | 9/2020 | Wang et al. | |
| 11,251,554 | B1 | 2/2022 | Tan et al. | |
| 11,581,687 | B2 | 2/2023 | Wang et al. | |
| 2011/0028047 | A1 * | 2/2011 | Wang | H01R 4/2433 439/673 |
| 2014/0211389 | A1 | 7/2014 | Zhou et al. | |
| 2015/0357734 | A1 * | 12/2015 | Copper | H01R 12/7076 439/660 |
| 2018/0109043 | A1 * | 4/2018 | Provencher | H01R 12/737 |
| 2018/0205181 | A1 | 7/2018 | Chen et al. | |
| 2019/0214753 | A1 | 7/2019 | Jiang et al. | |
| 2020/0028289 | A1 | 1/2020 | Dai et al. | |
| 2021/0044060 | A1 | 2/2021 | Wu et al. | |
| 2021/0203105 | A1 * | 7/2021 | Liu | H05K 3/366 |
| 2021/0399455 | A1 | 12/2021 | Wang et al. | |
| 2022/0077614 | A1 | 3/2022 | Tan et al. | |
| 2022/0302655 | A1 | 9/2022 | Wang et al. | |
| 2022/0360000 | A1 | 11/2022 | Tan et al. | |
| 2023/0047671 | A1 | 2/2023 | Wang et al. | |
| 2023/0050934 | A1 | 2/2023 | Yin et al. | |
| 2023/0369793 | A1 * | 11/2023 | Xu | H01R 12/737 |
| 2023/0387634 | A1 * | 11/2023 | Hou | H01R 13/6585 |

FOREIGN PATENT DOCUMENTS

| | | | | | |
|---|---|---|---|---|---|
| CN | 203205638 | U | 9/2013 | | |
| CN | 203850501 | U | 9/2014 | | |
| CN | 104283080 | A | 1/2015 | | |
| CN | 204376132 | U | 6/2015 | | |
| CN | 205016785 | U | 2/2016 | | |
| CN | 103887641 | B | 6/2016 | | |
| CN | 205944534 | U | 2/2017 | | |
| CN | 206962152 | U | 2/2018 | | |
| CN | 207116835 | U | 3/2018 | | |
| CN | 207517943 | U | 6/2018 | | |
| CN | 109004437 | A | 12/2018 | | |
| CN | 208284706 | U | 12/2018 | | |
| CN | 208433570 | U | 1/2019 | | |
| CN | 209675519 | U | 11/2019 | | |
| CN | 109659740 | B | 9/2020 | | |
| CN | 112103723 | A | 12/2020 | | |
| CN | 212380677 | U | 1/2021 | | |
| CN | 111769395 | B | 2/2022 | | |
| CN | 215816686 | U | 2/2022 | | |
| CN | 217239816 | | * 8/2022 | H01R 13/652 | |
| TW | I505580 | B | 10/2015 | | |
| TW | I509921 | B | 11/2015 | | |
| TW | M546036 | U | 7/2017 | | |
| TW | M563682 | U | 7/2018 | | |
| TW | M573906 | U | 2/2019 | | |
| TW | M584561 | U | 10/2019 | | |
| TW | M606366 | U | 1/2021 | | |
| TW | M618868 | U | 11/2021 | | |
| TW | M621514 | U | 12/2021 | | |

OTHER PUBLICATIONS

[No Author Listed], SFF-TA-1001 Specification for Universal x4 Link Definition for SFF-8639. Rev 1.1. SNIA Advance storage & information technology. May 28, 2018. 20 pages.

Cao et al., High Speed Electrical Connector, U.S. Appl. No. 18/097,778, filed Jan. 17, 2023.

Mason et al., SAS Standards and Technology Update. Storage Developer Conference (SDC). 2011. 46 pages. URL:https://www.snia.org/sites/default/orig/SDC2011/presentations/monday/HarryMason_SAS%20_Standards_Technology_Updater1.pdf [last accessed Jun. 2, 2022].

Tan et al., PSAS 5.0 Female Connector, U.S. Appl. No. 18/084,454, filed Dec. 19, 2022.

Wang et al., PCIE/SAS Female Connector, U.S. Appl. No. 18/076,066, filed Dec. 6, 2022.

Yin et all., High Speed Plug Connector, U.S. Appl. No. 17/848,851, filed Jun. 24, 2022.

* cited by examiner

HIGH SPEED ELECTRICAL CONNECTOR

RELATED APPLICATIONS

This application claims priority to and the benefit of Chinese Patent Application Serial No. 202222336962.7, filed on Sep. 2, 2022. The contents of this application are incorporated herein by reference in their entirety.

FIELD

This application relates generally to electrical connectors, such as those used to interconnect electronic assemblies.

BACKGROUND

Electrical connectors are used in many electronic systems. It is generally easier and more cost effective to manufacture a system as separate electronic subassemblies, such as printed circuit boards (PCBs), which may be joined together with electrical connectors. Having separable connectors enables components of the electronic system manufactured by different manufacturers to be readily assembled. Separable connectors also enable components to be readily replaced after the system is assembled, either to replace defective components or to upgrade the system with higher performance components.

A known arrangement for joining several printed circuit boards is to have one printed circuit board serve as a backplane. A known backplane is a PCB onto which many connectors may be mounted. Conducting traces in the backplane may be electrically connected to signal conductors in the connectors so that signals may be routed between the connectors. Other printed circuit boards, called "daughterboards," "daughtercards," or "midboards," may be connected through the backplane. For example, daughtercards may also have connectors mounted thereon. The connectors mounted on a daughtercard may be plugged into the connectors mounted on the backplane. In this way, signals may be routed among daughtercards through the connectors and the backplane. The daughtercards may plug into the backplane at a right angle. The connectors used for these applications may therefore include a right angle bend and are often called "right angle connectors."

Connectors may also be used in other configurations for interconnecting printed circuit boards. Sometimes, one or more printed circuit boards may be connected to another printed circuit board, called a "motherboard," that is both populated with electronic components and interconnects the daughterboards. In such a configuration, the printed circuit boards connected to the motherboard may be called daughterboards. The daughterboards are often smaller than the motherboard and may sometimes be aligned parallel to the motherboard. Connectors used for this configuration are often called "stacking connectors" or "mezzanine connectors." In other systems, the daughterboards may be perpendicular to the motherboard.

For example, this configuration is often used in computers in which the motherboard might have a processor and a bus configured to pass data between the processor and peripherals, such as a graphics processor or memory. Connectors may be mounted to the motherboard and connected to the bus. The peripherals may be implemented on daughtercards with connectors that mate with the connectors on the bus such that separately manufactured peripherals may be readily integrated into a computer made with the motherboard.

To enhance the availability of peripherals, the bus and the connectors used to physically connect peripherals via the bus may be standardized. In this way, there may be a large number of peripherals available from a multitude of manufacturers. All of those products, so long as they are compliant with the standard, may be used in a computer that has a bus compliant with the standard. Examples of such standards include serial ATA (SATA), serial attached SCSI (SAS), peripheral component interconnect express (PCIe), or SFF-8639, which are commonly used in computers. The standards have gone through multiple revisions, adapting to the higher performance expected from computers over time.

BRIEF SUMMARY

Aspects of the present disclosure relate to high speed electrical connectors.

Some embodiment relates to a connector subassembly. The connector subassembly may include a plurality of conductive elements aligned in a row direction, each of the plurality of conductive elements comprising a mating end, a mounting end opposite the mating end, and an intermediate portion joining the mating end and the mounting end, the plurality of conductive elements comprising signal conductors and ground conductors; an insulative member comprising first and second edges extending along the row direction, wherein the first edge is closer to the mating ends of the plurality of conductive elements; and a shielding member stacked on the insulative member and comprising a portion projecting from the first edge, wherein the shielding member is electrically connected to the ground conductors.

In some embodiments, the connector subassembly may include a lossy member stacked on the shielding member and electrically connecting the shielding member to the ground conductors.

In some embodiments, each of the intermediate portions of the ground conductors may comprise one or more holes. The lossy member may comprise portions extending through the holes of the intermediate portions of the ground conductors.

In some embodiments, the insulative member may comprise a plurality of portions extending between the first edge and second edge. Each of the plurality of portions of the insulative member may enclose one of the ground conductors along a length from the first edge to the second edge.

In some embodiments, each of the intermediate portions of the ground conductors may comprise one or more holes. Each of the plurality of portions of the insulative member may comprise one or more openings that each is stacked on one of the one or more holes of the intermediate portions of a respective ground conductor.

In some embodiments, the shielding member may comprise a plurality of openings that each is stacked on one of the openings of the plurality of portions of the insulative member.

In some embodiments, the connector subassembly may comprise a lossy member comprising a plurality of portions each extending through a stack of a hole of the ground conductor, an opening of the insulative member and an opening of the shielding member.

In some embodiments, the insulative member may comprise a plurality of windows each separating adjacent ones of the plurality of portions. The intermediate portions of the signal conductors may be exposed by the windows along at least 50% length of the intermediate portions.

In some embodiments, the shielding member may comprise a plurality of windows that each is stacked on one of the windows of the insulative member.

In some embodiments, the connector subassembly may comprise a lossy member comprising a plurality of windows that each is stacked on one of the windows of the shielding member.

In some embodiments, the portion of the shielding member projecting from the first edge of the insulative member may comprise a plurality of parts each corresponding to a group of the signal conductors.

In some embodiments, the group of the signal conductors may comprise a pair of signal conductors, or two pairs of signal conductors separated by a ground conductor, or a pair of signal conductors and a single signal conductor separated by a ground conductor.

Some embodiment relates to an electrical connector. The electrical connector may include a housing comprising a base portion, first and second walls extending from the base portion and separated by a slot; a plurality of conductive elements coupled to the first wall, the plurality of conductive elements comprising mating ends curving into the slot, and mounting ends opposite the mating ends; and a shielding member comprising a first portion disposed in the base portion, a second portion disposed in the first wall, and a third portion extending out of the base portion.

In some embodiments, the electrical connector may comprise a lossy member electrically connecting the shielding member and selected ones of the plurality of conductive elements.

In some embodiments, the electrical connector may comprise an insulative member stacked between the plurality of conductive elements and the shielding member.

In some embodiments, the plurality of conductive elements may be a first plurality of conductive elements. The electrical connector may comprise a second plurality of conductive elements coupled to the second wall, the second plurality of conductive elements comprising mating ends curving into the slot, and mounting ends opposite the mating end and extending out of the housing.

In some embodiments, the shielding member may be a first shielding member. The electrical connector may comprise a second shielding member attached to an outside of the second wall, the second shielding member comprising a plurality of beams extending through the second wall and into the slot.

In some embodiments, the plurality of beams of the second shielding member may each comprise a contact portion configured to contact a distal end of a selected one of the second plurality of conductive elements.

In some embodiments, the lossy member may be a first lossy member. The electrical connector may comprise a second lossy member disposed in the base portion, the second lossy member electrically connecting the selected ones of the second plurality of conductive elements.

Some embodiment relates to a connector subassembly. The connector subassembly may include a plurality of conductive elements aligned in a row direction; an insulative member molded over the plurality of conductive elements, the insulative member comprising a plurality of windows exposing a subset of the plurality of conductive elements; and a shielding member comprising a plurality of windows aligning with the plurality of windows of the insulative member.

In some embodiments, the plurality of conductive elements may comprise portions extending from the insulative member in a mating direction. The shielding member may comprise a plurality of portions parallel to the portions of the plurality of conductive elements extending from the insulative member in the mating direction.

In some embodiments, the shielding member may comprise a plurality of slots separating the plurality of portions of the shielding member.

In some embodiments, the connector subassembly may comprise a lossy member molded over the shielding member, the lossy member comprising a plurality of windows aligning with the plurality of windows of the shielding member, and a plurality of projections through the shielding member, insulative member and selected ones of the plurality of conductive elements.

Some embodiment relates to a method of manufacturing a connector subassembly comprising a plurality of conductive elements each comprising a mating end, a mounting end opposite the mating end, and an intermediate portion joining the mating end and the mounting end. The method may include molding an insulative plastic over portions of the intermediate portions of the plurality of conductive elements such that the plurality of conductive elements are disposed in a row in an edge-to-edge configuration; stacking a shielding member on the molded insulative plastic; and molding a lossy material over portions of the shielding member and portions of the molded insulative plastic such that the lossy material electrically connects the shielding member with selected ones of the plurality of conductive elements.

In some embodiments, molding the lossy material over the portions of the shielding member and the portions of the molded insulative plastic may comprise filling the lossy material into groups of openings, each of the group of openings comprising a hole of a selected one of the plurality of conductive elements, an opening of the molded insulative plastic stacked on the hole of the selected one of the plurality of conductive elements, and an opening of the shielding member stacked on the opening of the molded insulative plastic.

Some embodiment relates to a connector subassembly. The connector subassembly may include an insulative member; and a plurality of conductive elements held by the insulative member, each of the plurality of conductive elements comprising a mating end, a mounting end opposite the mating end, and an intermediate portion joining the mating end and the mounting end, the plurality of conductive elements comprising pairs of signal conductors and ground conductors disposed between the pairs of signal conductors. Each of the ground conductors may comprise a first portion and a second portion separated by a slot until joining with each other at the mating end. The insulative member may comprise portions extending through the slots of the ground conductors.

In some embodiments, for each of the ground conductors, the slot may be shaped and sized such that the first portion and the second portion have uniform widths.

In some embodiments, for each of the ground conductors, the slot may be shaped and sized such that the mating end can be displaced by a greater distance under a force of a same magnitude.

In some embodiments, broadsides of the intermediate portions of the ground conductors may be wider than broadsides of the intermediate portions of the signal conductors. The slots of the ground conductors may be shaped and sized such that the mating ends of the ground conductors can be displaced by a similar (the same or substantially the same) distance as the mating ends of the signal conductors under a force of a same magnitude.

In some embodiments, broadsides of the mating ends of the ground conductors may have a same width as broadsides of the mating ends of the signal conductors.

In some embodiments, broadsides of the mounting ends of the ground conductors may have a same width as broadsides of the mounting ends of the signal conductors.

In some embodiments, the mating ends of the plurality of conductive elements may be separated from each other by a first distance. The intermediate portions of the plurality of conductive elements may be separated from each other by a second distance. Each of the plurality of conductive elements may comprise a first transition portion joining the mating end and the intermediate portion such that the first distance is greater than the second distance and a second transition portion joining the mounting end and the intermediate portion such that the mounting ends of the plurality of conductive elements are separated from each other by the first distance.

In some embodiments, the connector subassembly may comprise a shielding member stacked on the insulative member and comprising a plurality of slots at least partially overlapping with slots of selected ones of the ground conductors.

In some embodiments, the shielding member may extend to the mating ends of the plurality of conductive elements.

Some embodiment relates to an electrical connector. The electrical connector may include a housing comprising a base portion, first and second walls extending from the base portion and separated by a slot; and a plurality of conductive elements coupled to the first wall, each of the plurality of conductive element comprising a mating end curving into the slot, a mounting end opposite the mating end, and an intermediate portion joining the mating end and the mounting end. For each of the plurality of conductive elements, the intermediate portion may comprise a first portion disposed in the base portion of the housing, and a second portion extending from the first portion into a channel of the first wall of the housing. The second portion may comprise an opening elongating along the length of the second portion until the mating end.

In some embodiments, for each of the plurality of conductive elements, the intermediate portion may comprise a third portion extending from the first portion and out of the base portion of the housing.

In some embodiments, for each of the plurality of conductive elements, the third portion of the intermediate portion may comprise a bend extending in an obtuse angle.

In some embodiments, the plurality of conductive elements may be a plurality of ground conductors. The electrical connector may comprise a plurality of signal conductors disposed between the ground conductors.

In some embodiments, individual signal conductors may be narrower than individual ground conductors.

In some embodiments, the plurality of conductive elements may be a first plurality of conductive elements. The electrical connector may comprise a second plurality of conductive elements coupled to the second wall, the second plurality of conductive element each comprising a mating end comprising a contact portion curving into the slot, a mounting end opposite the mating end, and an intermediate portion joining the mating end and the mounting end. For each of the second plurality of conductive elements, the intermediate portion may comprise a first portion disposed in the base portion of the housing, and a second portion extending from the first portion and out of the base portion of the housing. The second portion may comprise an opening.

In some embodiments, for each of the second plurality of conductive elements, the second portion of the intermediate portion may comprise a first part extending perpendicular to the first portion, and a second part joining the first part and the first portion. The opening may be disposed at the second part.

In some embodiments, the mounting ends of the first plurality of conductive elements may extend from respective intermediate portions and away from the mounting ends of the second plurality of conductive elements. The mounting ends of the second plurality of conductive elements may extend from respective intermediate portions and towards the mounting ends of the first plurality of conductive elements.

These techniques may be used alone or in any suitable combination. The foregoing summary is provided by way of illustration and is not intended to be limiting.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1A:
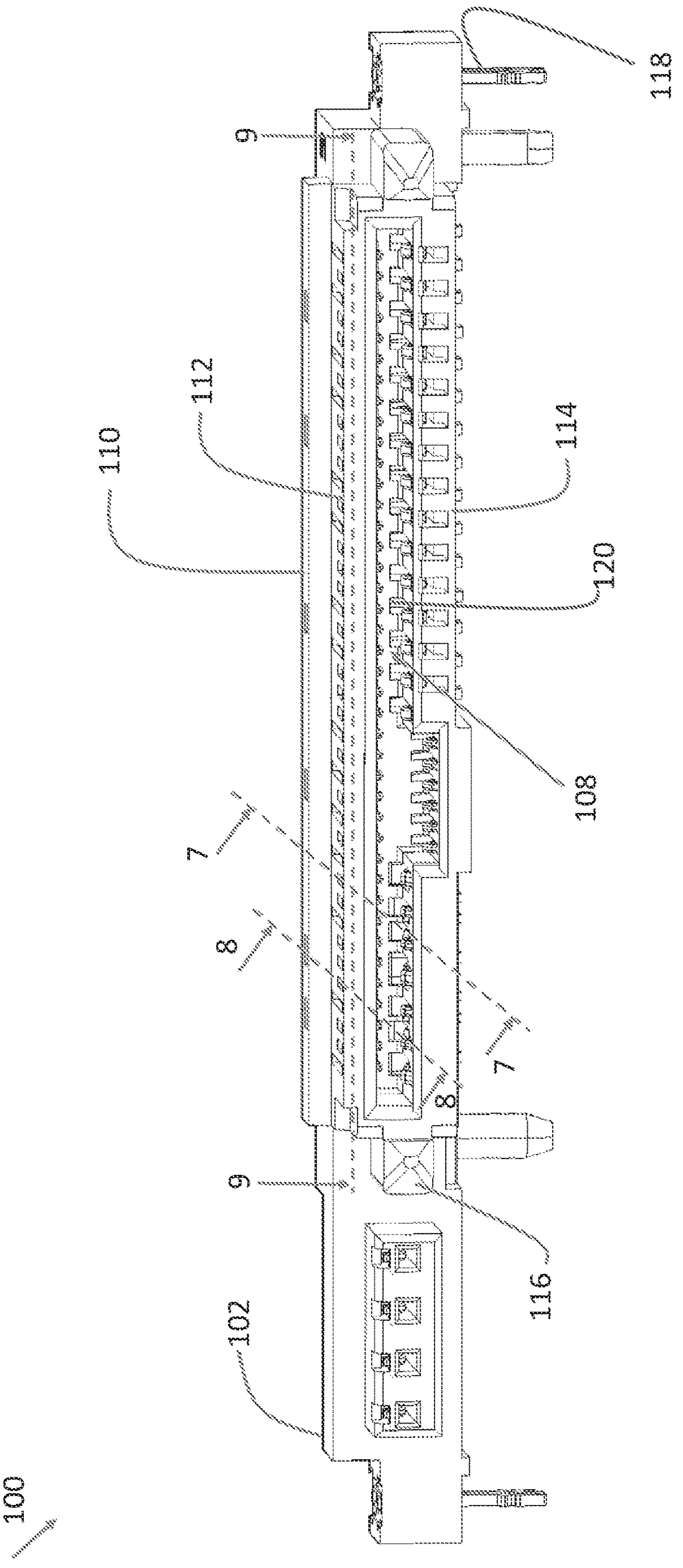
FIG. 1A is a front perspective view of a receptacle connector, showing a mating interface, according to some embodiments.

The Inventors have recognized and appreciated connector design techniques that satisfy electrical and mechanical requirements to support greater bandwidth through high frequency operation. Some of these techniques may synergistically support higher frequency connector operation and satisfy the physical requirements set by industry standards such as PCIeSAS. A connector satisfying the mechanical requirements of the PCIeSAS specification at the performance required for GEN 6 and beyond is used as an example of a connector in which these techniques have been applied.

An electrical connector may have one or more rows of conductive elements. Some of the conductive elements in a row may serve as high-speed signal conductors. Optionally, some of the conductive elements may serve as low-speed signal conductors or power conductors. Some of the low-speed signal conductors and/or power conductors may also be designated as grounds, referencing the signals carried on the signal conductors or providing a return path for those signals. It should be appreciated that ground conductors need not to be connected to earth ground, but may carry reference potentials, which may include earth ground, DC voltages or other suitable reference potentials.

The conductive elements may each have a mating end comprising a mating contact surface, configured for mating with a complementary mating contact surface of another electrical component, such as a printed circuit board or a complementary connector. Each conductive element may also have a mounting end comprising a mounting contact surface, configured for mounting the connector to another electrical component, such as a printed circuit board or a cable. Each conductive element may also have an intermediate portion, joining the mating end and the mounting end.

The conductive elements in a row may be formed into one or more subassemblies. A subassembly may include an insulative member holding conductive elements in a row. The conductive elements may be held in an edge-to-edge configuration. The insulative member may include first and second edges extending parallel to the row direction, and portions extending between the first and second edges. The first edge may be closer to the mating ends of the conductive elements. The second edge may be closer to the mounting ends of the conductive elements. A shielding member may be stacked on the insulative member and have a portion projecting from the first edge of the insulative member such that the shielding member may provide shielding to the conductive elements beyond the first edge of the insulative member and closer to and/or to the mating ends.

The conductive elements in the subassembly may include ground conductors, which may be electrically connected to the shielding member via a lossy member. The lossy member may be stacked on the shielding member. The lossy member may include portions that fill groups of openings stacked on each other so as to electrically and mechanically connect the ground conductors with the shielding member. A group of openings may include a hole of a ground conductor, an opening of the insulative members stacked on the hole of the ground conductor, and an opening of the shielding member stacked on the opening of the insulative member.

The conductive elements in the subassembly may include pairs of signal conductors separated by ground conductors. For the ground conductors, an intermediate portion may have first and second portions separated by a slot until joining each other at the mating end. The slots may enable the ground conductors to be wider at the intermediate portions than the signal conductors so as to better reduce crosstalk among the pairs, while enabling the ground conductors to be displaced by a similar distance as the signal conductors under a mating force of a same magnitude. The slots may also enable the insulative member to hold the conductive element in the row at least partially through the slots. For example, the first edge of the insulative member may have portions extending through the slots of the ground conductors. The ground conductors may be configured similar to the signal conductors at the ends so as to satisfy the dimension requirements of the industry standards regarding the mating and mounting interfaces.

Portions of the pairs of signal conductors may be exposed by windows. In some embodiments, for each pair, an intermediate portion may extend, not covered by the insulative member, shielding member and lossy member, along at least 30% of its length, and in some embodiments, at least 40%, 50%, or 70% of its length. This configuration may reduce impedance variation and reduce loss along the lengths of the signal conductors. In some embodiments, the insulative member, shielding member and lossy member may have stacked windows such that portions of the intermediate portions of the signal conductors may be exposed through the stacked windows.

The shielding member may include parts projecting from the first edge of the insulative member so as to provide shielding to the conductive elements beyond the first edge of the insulative member and closer to and/or to the mating ends of the conductive elements. The parts may be separated from each other by slots, which may be disposed corresponding to the slots of the ground conductors. In some embodiments, the slots separating the parts of the shielding member may at least partially overlap with the slots of the ground conductors. This configuration may reduce coupling through the shield, which could cause cross-talk. This configuration may enhance the mechanical strength of the shielding member at the distal end by removing materials, without affecting the shielding provided by the shielding member.

The subassembly may have a first portion inserted into a connector housing. The connector housing may have a base portion elongating in the row direction, first and second walls extending from the base portion in a direction perpendicular to the row direction and separated from each other by a slot. Portions of the conductive elements in the subassembly may line the first wall. The mating ends of the conductive elements may have contact portions curve into the slot. The first edge of the insulative member may be held at the joint between the base portion and the first wall, such that the parts of the shielding member project into the first wall. This configuration separates the conductive elements in the subassembly from the shielding member with the insulative material of first wall and therefore prevents the signal conductors from shorting to the shielding member when pushed up by a mating component.

The subassembly may have a second portion extending out of the base portion. The second portion may have a bent extending in an angle such that the contact surfaces of the mounting ends are substantially parallel to the contact surfaces of mating ends. Although the second portion may extend a longer distance than conductive elements and/or subassemblies lining along the second wall, the insulative member and the lossy member at the second portion may keep the conductive elements in place and prevent the conductive elements from moving when being mounted to another component such as a printed circuit board.

Conductive elements lining along the second wall may form one or more subassemblies. A subassembly may be configured similarly to the subassembly described above, or may have additional or alternative features. In some embodiments, a subassembly may have a shielding member attached to a bottom of the second wall of the connector housing. The shielding member may have beams extending though openings of the second wall of the connector housing and into the slot between the first and second walls of the connector housing. The beams are disposed such that ground conductors in the subassembly may make contact with contact portions of the beams when pushed by a mating component. Portions of the ground conductors of the subassembly extending out of the base portion of the connector housing may have openings so as to enable the ground conductors to be wider than the signal conductors while bent into a right angle by a force of a same magnitude as the signal conductors.

The mounting ends of the conductive elements lining along the second wall may extend in the same direction as the mounting ends of the conductive elements lining along the first wall. This configuration enables the conductive elements to be shorter while satisfying a same footprint. The conductive elements lining the second wall may be shorter than if the conductive elements with mating ends extending toward the connector housing, since the conductive elements may need to extend farther out of the base portion of the connector housing to provide the space for the mating ends extending toward the connector. The conductive elements lining along the first wall may be shorter, since the conductive elements may need to extend farther out of the base portion to be separated from the conductive elements lining along the second wall for a safe distance.

Figure 1B:
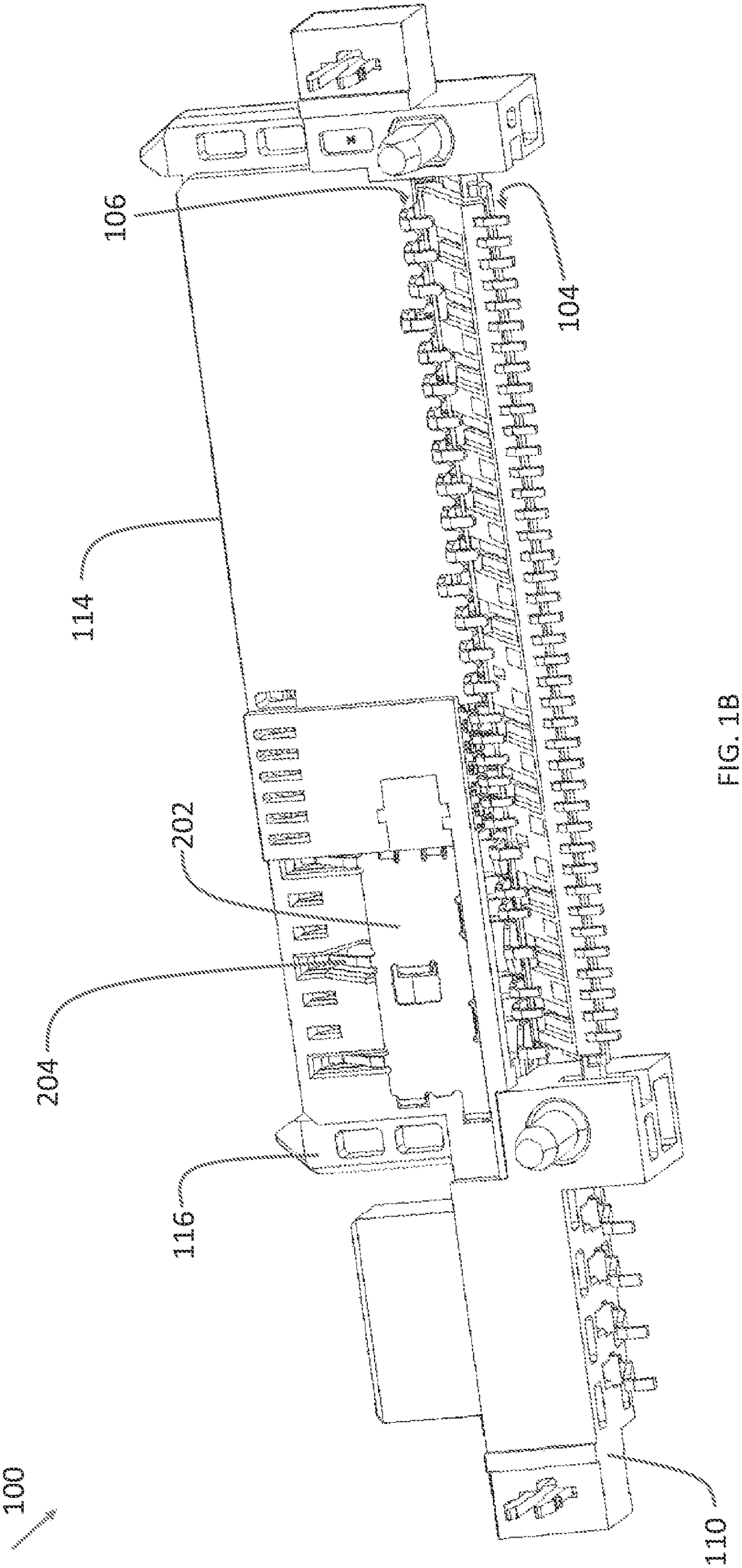
FIG. 1B is a bottom perspective view of the receptacle connector of FIG. 1A, showing a mounting interface.
Figure 2:
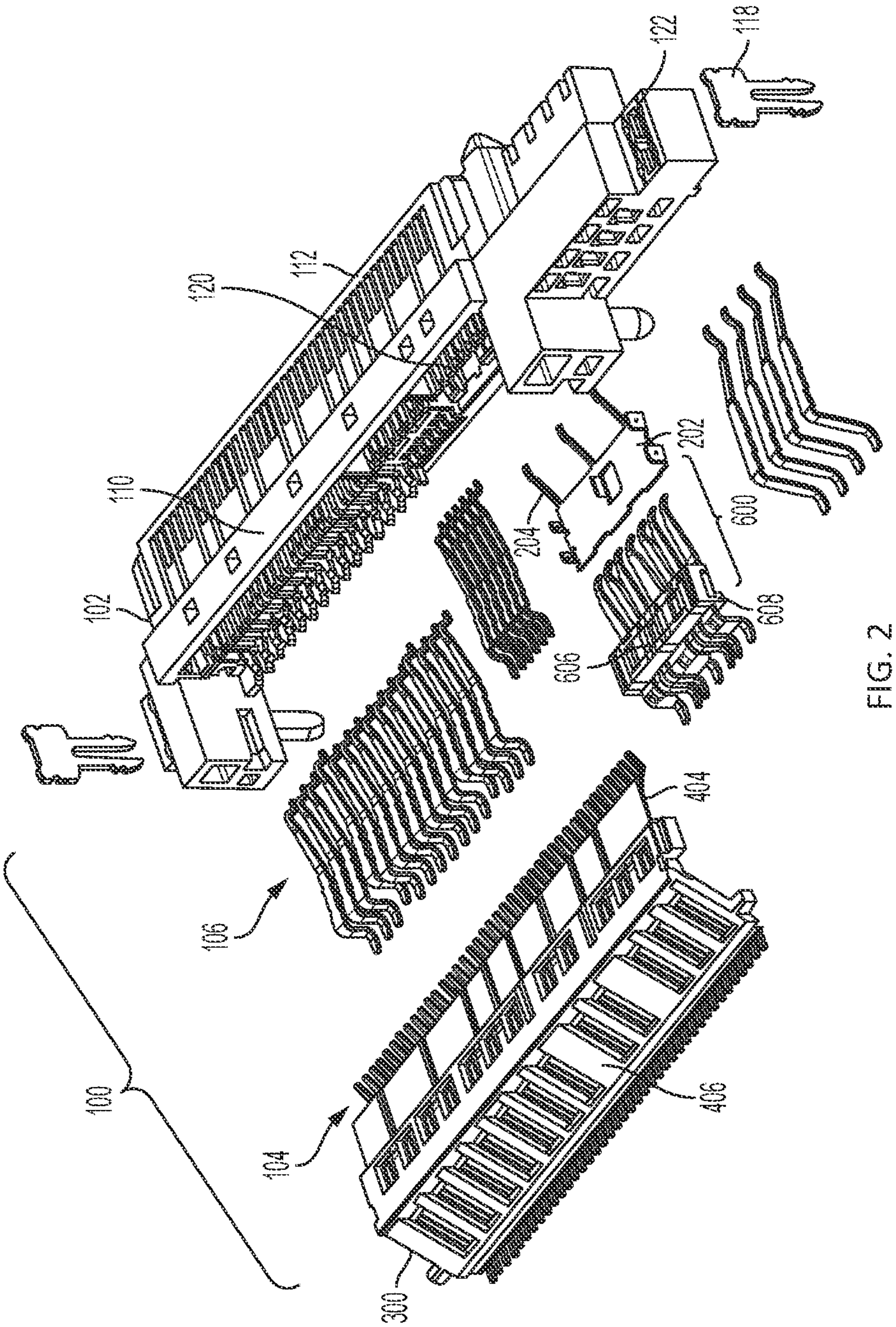
FIG. 2 is a partially exploded top perspective view of the receptacle connector of FIG. 1A.
Figure 3A:
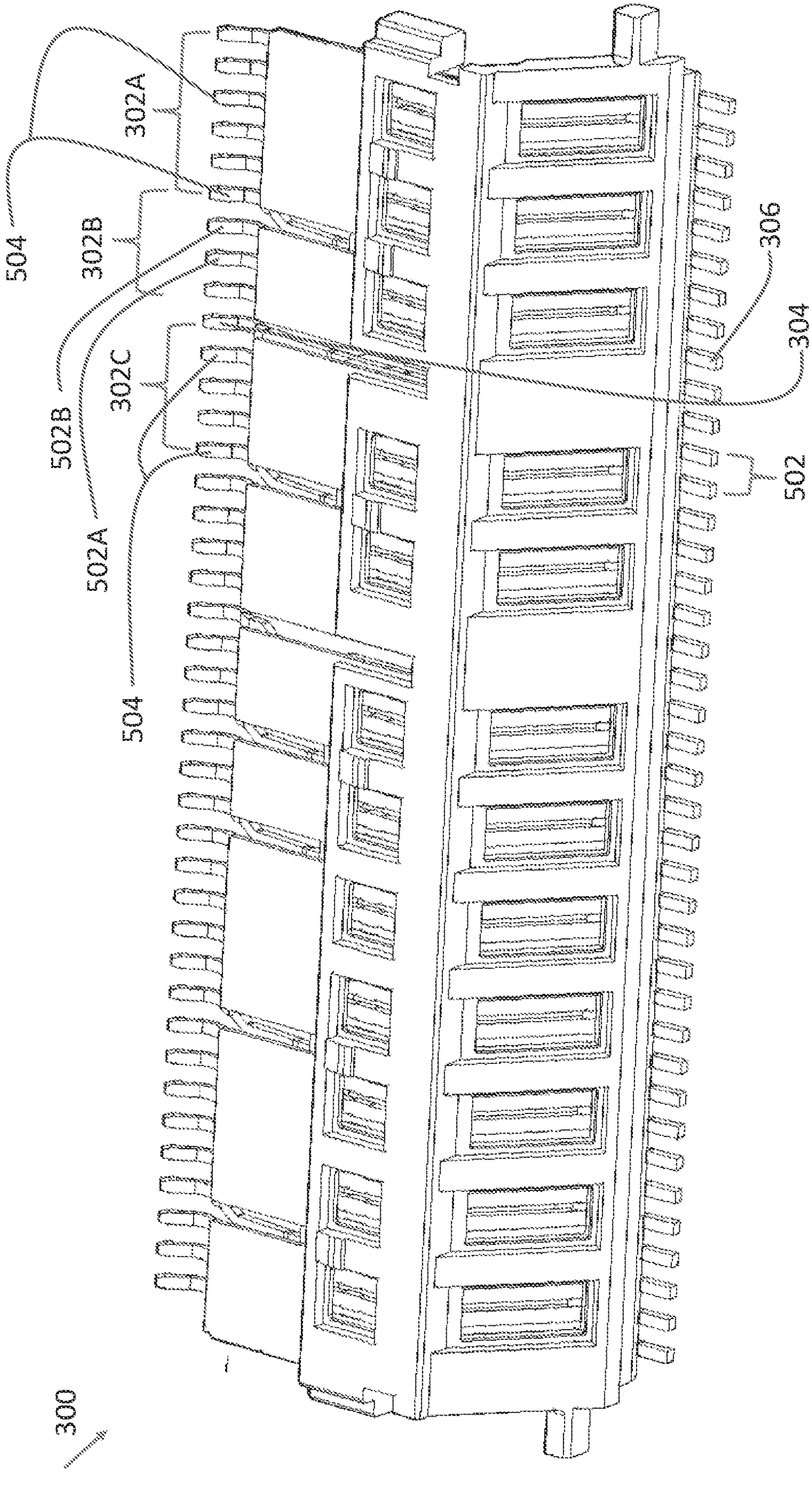
FIG. 3A is a top perspective view of a connector subassembly of the receptacle connector of FIG. 1A.
Figure 3B:
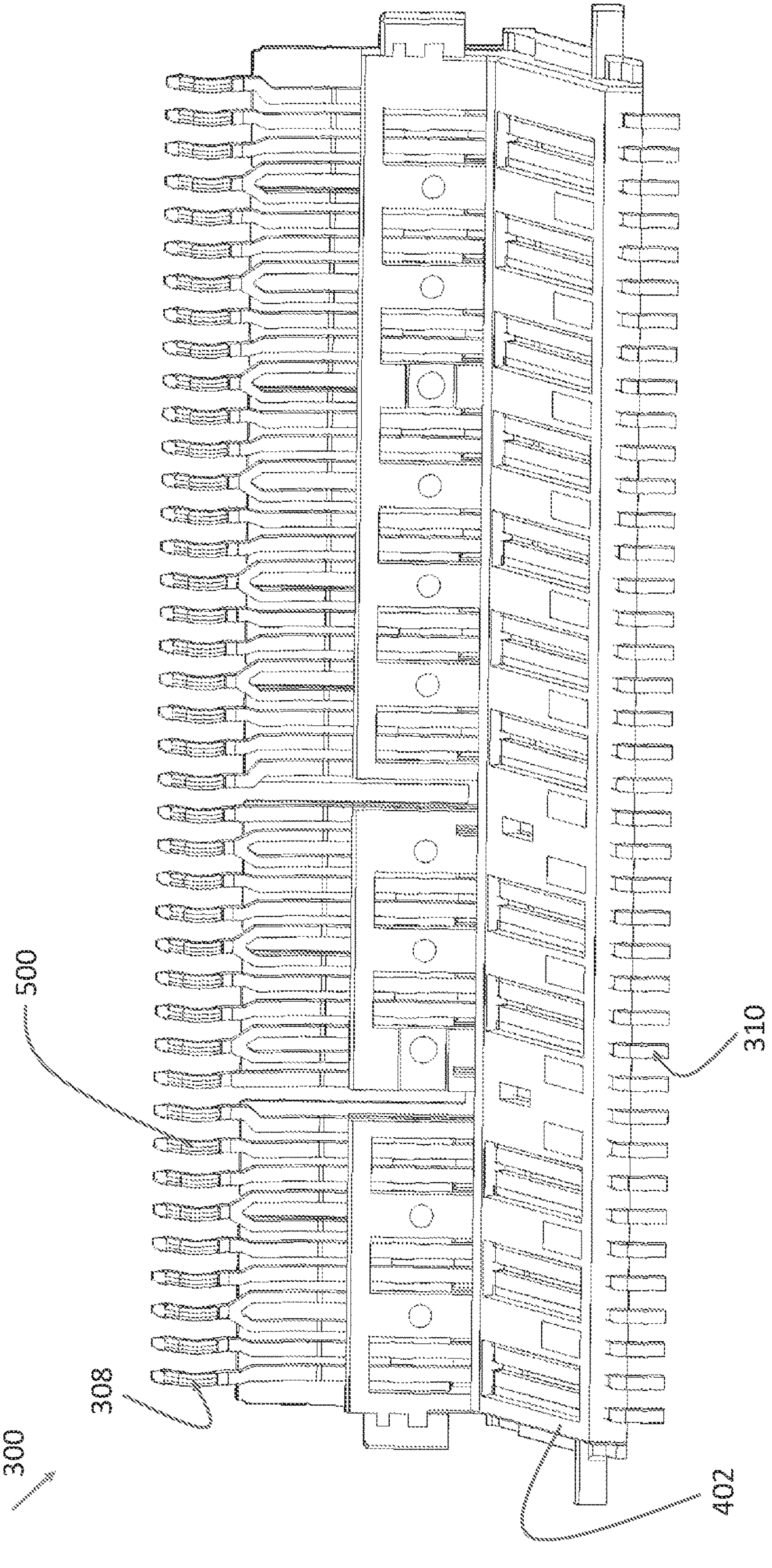
FIG. 3B is a bottom perspective view of the connector subassembly of FIG. 3A.

FIGS. 1A-2 are an example of techniques as described herein integrated into a receptacle connector. In this example, receptacle connector 100 may include a housing 102, which may have a base portion 110, first wall 112 and second wall 114 extending from the base portion 110 and separated by a slot 108 elongating in a row direction. Housing 102 may also include guide members 116 that may extend at opposite sides of the slots 108. The guide members 116 may be configured to engage complementary guide members of another electrical component (e.g., a plug connector). The housing 102 may also include slots 122 on opposite sides with locking member 118 inserted in the slots 122. Locking members 118 may be configured to enhance the attachment between the receptacle connector 100 and another electrical component that the receptacle connector 100 is mounted to, such as a printed circuit board. The housing 102 may include channels 120 shaped and disposed to receive respective conductive elements and/or connector subassemblies.

The connector 100 may include a top row 104 of conductive elements and a bottom row 106 of conductive elements, separated from each other by the slot 108 of the housing 102. As illustrated, the top row 104 of conductive elements may include conductive elements that may be shaped differently for various purposes including, for example, signal, ground, power, or any suitable purposes. The bottom row 106 of conductive elements may also include conductive elements that may be shaped differently for various purposes including, for example, signal, ground, power, or any suitable purposes.

The connector 100 may include, in one or more rows, connector subassemblies, such as subassembly 300 and subassembly 600, configured to reduce crosstalk and enable high-speed transmissions. The subassemblies may be retained in the housing by being sized and shaped to fit in a corresponding channel of the housing. In the illustrated example, the top row 104 of conductive elements and associated insulative member 402 (FIG. 4) and shielding member 404 and lossy member 406 form the connector subassembly 300. Some of the bottom row 106 of conductive elements and associated insulative member 608 and lossy member 606 and shielding member 202 form the connector subassembly 600.

As illustrated in FIGS. 3A-5, the connector subassembly 300 may include a lead assembly 500. The lead assembly 500 may include conductive elements that may have broadsides 522 joined by edges 524. The edges 524 may be narrower than the broadsides 522. Each conductive element may include a mating end 506 comprising a mating contact surface 308, a mounting end 508 opposite the mating end 506 and comprising a mounting contact surface 310, and an intermediate portion 510 extending between the mating end 506 and the mounting end 508. In the illustrated example, the mating contact surface 308 extends substantially parallel to the mounting contact surface 310. This is not intended to be limiting. For example, a mating contact surface may extend substantially perpendicular to a mounting contact surface.

In the illustrated example, the conductive elements in the lead assembly 500 includes signal conductors such as pairs 502 of signal conductors 502A and 502B and single signal conductors 304, and ground conductors such as ground conductors 504 and 528 disposed between the signal conductors. As illustrated, the pairs 502 of signal conductors may be disposed between ground conductors 504. A single signal conductor 304 may be disposed between a ground conductor 504 and a ground conductor 528. The intermediate portions of the ground conductors may include holes 526A and 526B.

The conductive elements in a lead assembly may be configured to synergistically provide enhanced shielding and satisfy the physical requirements set by industry standards. The broadsides of the intermediate portions of the ground conductors may be wider than the broadsides of the intermediate portions of the signal conductors such that stronger shielding is provided between adjacent signal conductors. The broadsides of the mating ends and the mounting ends of the conductive elements may have a same width or different widths such that dimensional requirements by industry standards at the mating and mounting interface are satisfied. The mating ends of the conductive elements may be separated from each other by a first distance d1. The intermediate portions of the conductive elements may be separated from each other by a second distance d2. The conductive elements may each include a first transition portion 512 joining the mating end 506 and the intermediate portion 510 such that the first distance d1 is greater than the second distance d2. The conductive elements may each include a second transition portion 514 joining the mounting end 508 and the intermediate portion 510 such that the mounting ends of the conductive elements are separated from each other by a third distance d3. The third distance d3 may be the same or different from the first distance d1 according to the industry standards.

Figure 10B:
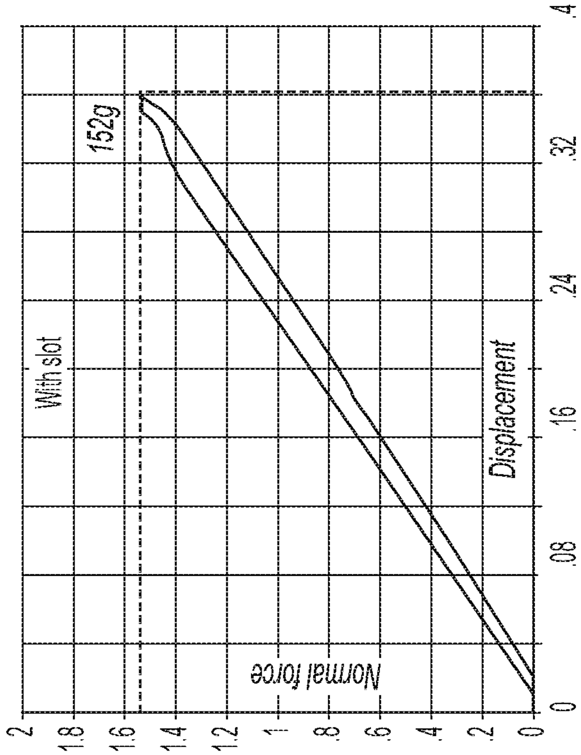
FIG. 10B is a force-displacement graph for a ground conductor with a slot, according to some embodiments.
Figure 10A:
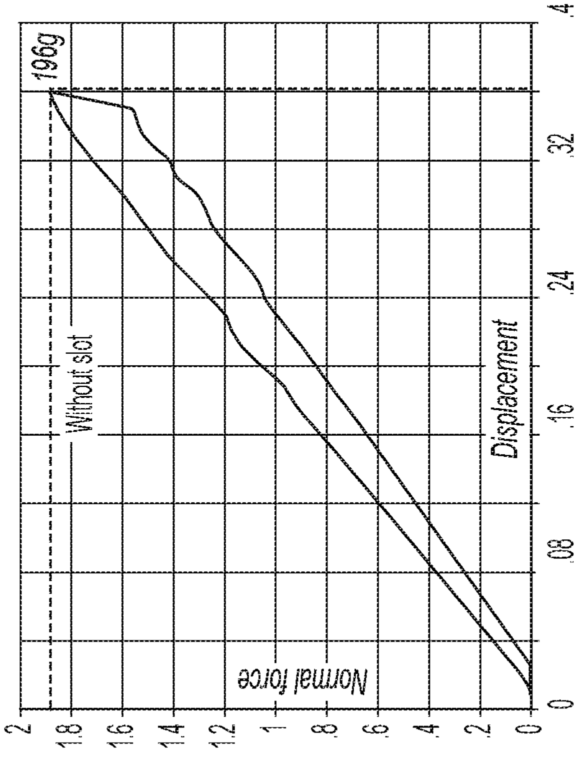
FIG. 10A is a force-displacement graph for a conventional ground conductor.

The ground conductors may be configured such that their mating ends can be displaced by a similar distance as the mating ends of the signal conductors under mating forces of a similar magnitude, which may be provided by conductive elements of a mating component having a standardized mating interface. If a bigger mating force is required by a ground conductor as its intermediate portion is wider, then a mating component may need to be customized, which may be undesirable. In the illustrated example, the intermediate portion 510 of a ground conductor 504 may include a first portion 516 and a second portion 518 separated by a slot 520 until joining with each other at the mating end 506. The slot 520 may be shaped and sized such that the mating end 506 of the ground conductor 504 may be displaced without undesirable deformation by a greater distance under a force of a same magnitude than without the slot 520. FIG. 10A is a force-displacement graph for a conventional ground conductor. FIG. 10B is a force-displacement graph for a ground conductor with a slot, according to some embodiments. As illustrated, the ground conductor with a slot requires less force for the same amount of displacement than the conventional ground conductor.

The first portion 516 and the second portion 518 may have uniform widths or different widths so as to provide balanced shielding to the signal conductors on opposite sides of the ground conductor 504. As illustrated, the intermediate portion 510 of a ground conductor 504 may include a narrower portion 530 disposed closer to a signal conductor of the pair 520 than a single signal conductor 304, since the crosstalk generated by the pair 520 may be greater than that of the single signal conductor 304.

The insulative member 402 may hold the conductive elements in an edge-to-edge configuration. The insulative member 402 may include a first edge 414 extending along the row direction and closer to the mating ends 506 of the conductive elements, and a second edge 416 extending along the row direction and closer to the mounting ends 508 of the conductive elements. The insulative member 402 may include portions 408 extending between the first edge 414 and second edge 416. Each portion 408 may substantially enclose one of the ground conductors along a length from the first edge 414 to the second edge 416, and may include openings 410A stacked on the holes 526A of respective ground conductors and openings 410B stacked on the holes 526B of respective ground conductors. The portions 408 may be separated from adjacent portions 408 by windows 412. The intermediate portions 510 of the signal conductors may be exposed by the windows 412 along at least 30% of the lengths of the signal conductors, and in some embodiments, at least 40%, 50%, or 70% of the lengths of the signal conductors. This configuration may reduce impedance imbalance along the lengths of the signal conductors. The insulative member 402 may be formed by molding an insulative plastic over portions of the intermediate portions 510 of the conductive elements such that the conductive elements are disposed in a row in an edge-to-edge configuration. Portions of the insulative member 402 may extend through the slots 520 of the ground conductors.

The shielding member 404 may be stacked on the insulative member 402. The shielding member 404 may include openings 420A stacked on respective openings 410A of the insulative member 402 and openings 420B stacked on the openings 410B of the insulative member 402. The shielding member 404 may also include windows 422 stacked on respective windows 410 of the insulative member 402. The shielding member 404 may include a portion projecting from the first edge 414 of the insulative member 402 so as to provide shielding beyond the first edge 414 of the insulative member 402 and closer to and/or to the mating ends 506 of the conductive elements. The portion of the shielding member 404 projecting from the first edge 414 may include parts 424 separated by slots 418. Each part 424 may be disposed corresponding to a group of conductive elements such as 302A, 302B, and 302C. The slots 418 may be disposed corresponding to the slots 520 of the ground conductors 504. In some embodiments, the slots 418 separating the parts 424 of the shielding member 404 may overlap with the slots 520 of the ground conductors 504. This configuration enables the first and second portions 516 and 518 of the ground conductor 504 to couple with respective parts 424 to provide shielding for respective groups of conductive elements. The mechanical strength of the shielding member 404 may also be enhanced at the distal end by removing materials through the slots 418.

Figure 7:
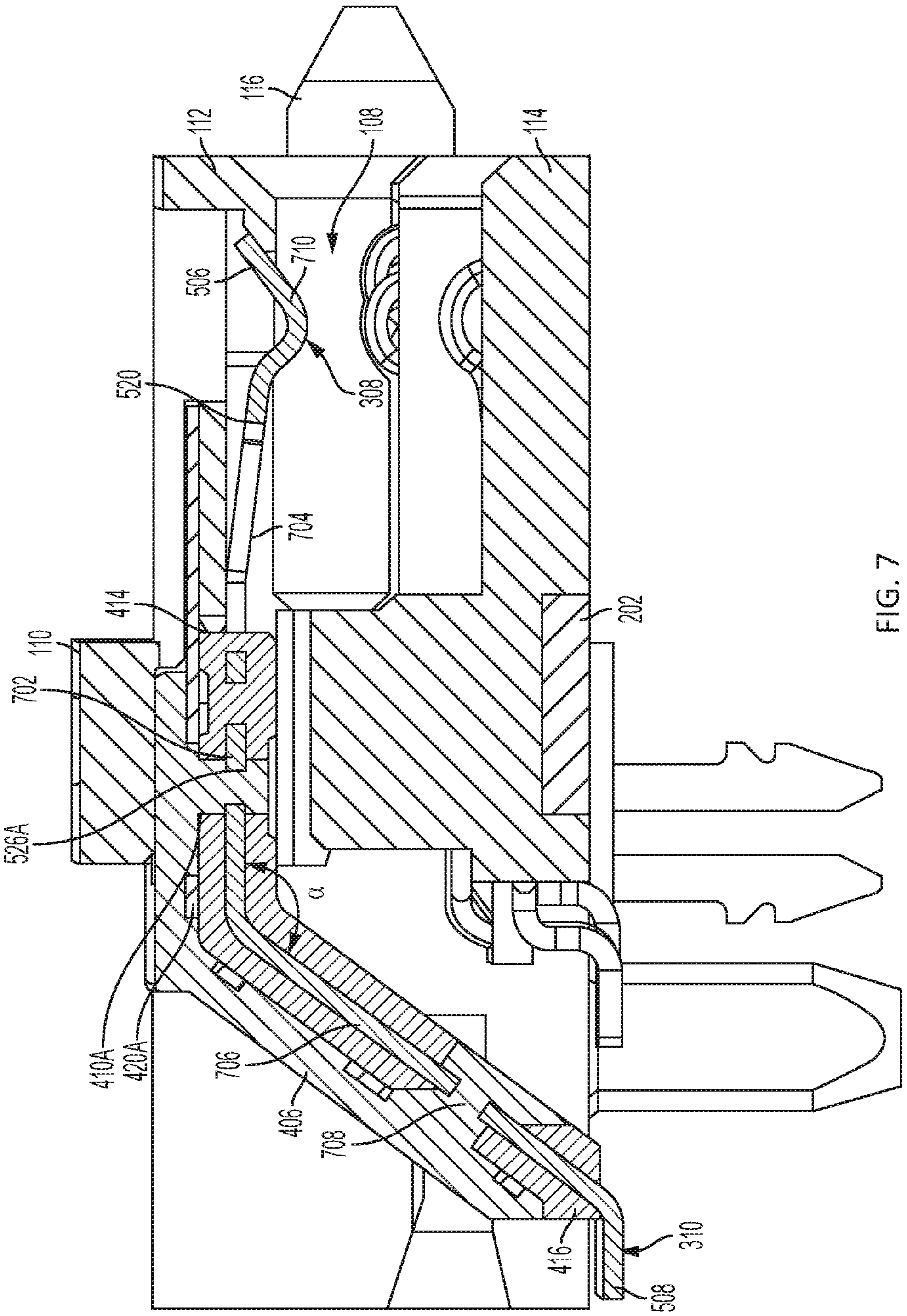
FIG. 7 is a cross-sectional perspective view of the receptacle connector of FIG. 1A along the line marked "7-7" in FIG. 1A.
Figure 8:
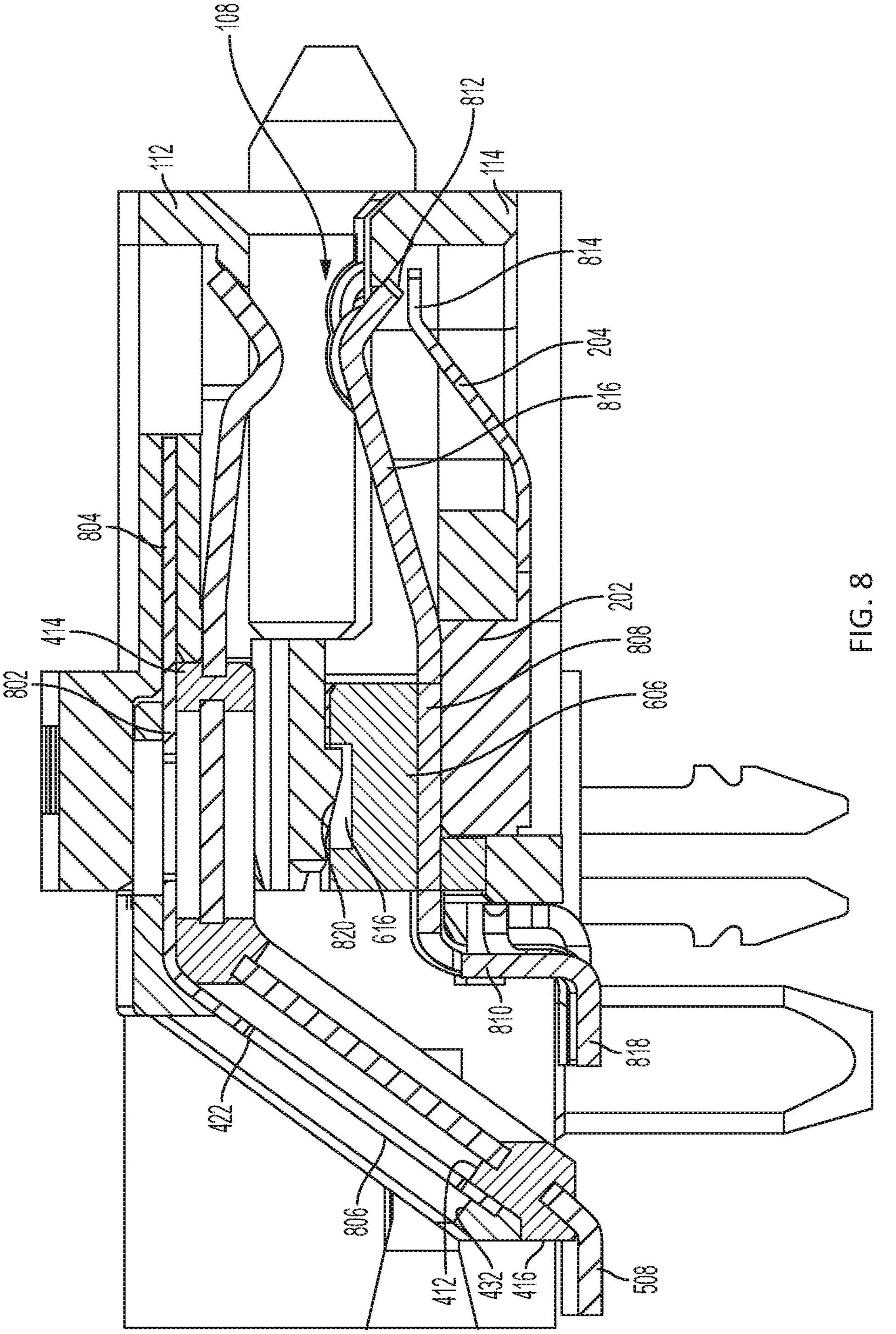
FIG. 8 is a cross-sectional perspective view of the receptacle connector of FIG. 1A along the line marked "8-8" in FIG. 1A.

The lossy member 406 may be stacked on the shielding member 404. As shown in FIG. 7, the lossy member 406 may include portions 708 electrically connecting the shielding member 404 to the ground conductors. As illustrated, the holes 526A of the ground conductors and the openings 410A and 420A of the insulative member 402 and shielding member 404 may be aligned; and the holes 526B of the ground conductors and the openings 410B and 420B of the insulative member 402 and shielding member 404 may be aligned. The portions 708 of the lossy member 406 may extend through the stacks of holes and openings. The lossy member 406 may include windows 432 stacked on respective windows 422 of the shielding member 404. As shown in FIG. 8, the windows 412, 422 and 432 of the insulative member 402, shielding member 404 and lossy member 406 may be aligned such that the intermediate portions 510 of the signal conductors may be exposed by the windows along at least 30% of the lengths of the signal conductors, and in some embodiments, at least 40%, 50%, or 70% of the lengths of the signal conductors. The lossy member 406 may be formed by molding a lossy material over portions of the shielding member 404 and portions of the insulative member 402.

Figure 6:
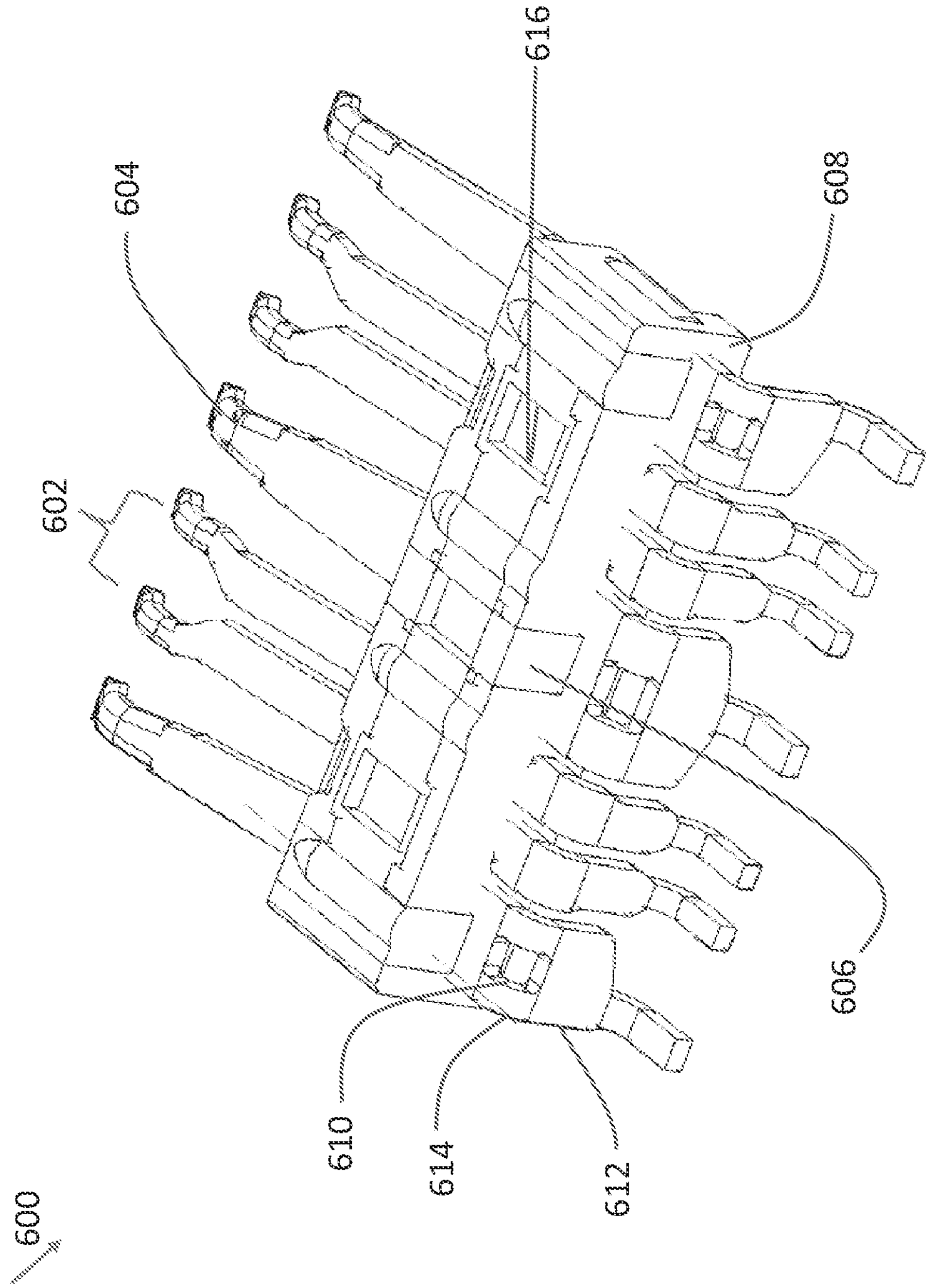
FIG. 6 is a top perspective view of another connector subassembly of the receptacle connector of FIG. 1A.

As illustrated in FIG. 6, the connector subassembly 600 may include conductive elements comprising pairs 602 of signal conductors and ground conductors 604 dispersed between the pairs 602 of signal conductor. An insulative member 608 may hold the conductive elements in an edge-to-edge configuration. A lossy member 606 may be configured to electrically connect the ground conductors 604. The lossy member 606 may include recesses 616 configured to mate with a projection 820 (FIG. 8) of the connector housing 102 such that the connector subassembly 600 is accurately and stably retained in the connector housing 102. The connector subassembly 600 may further include the shielding member 202 (shown in FIG. 2), which may include beams 204.

Figure 5:
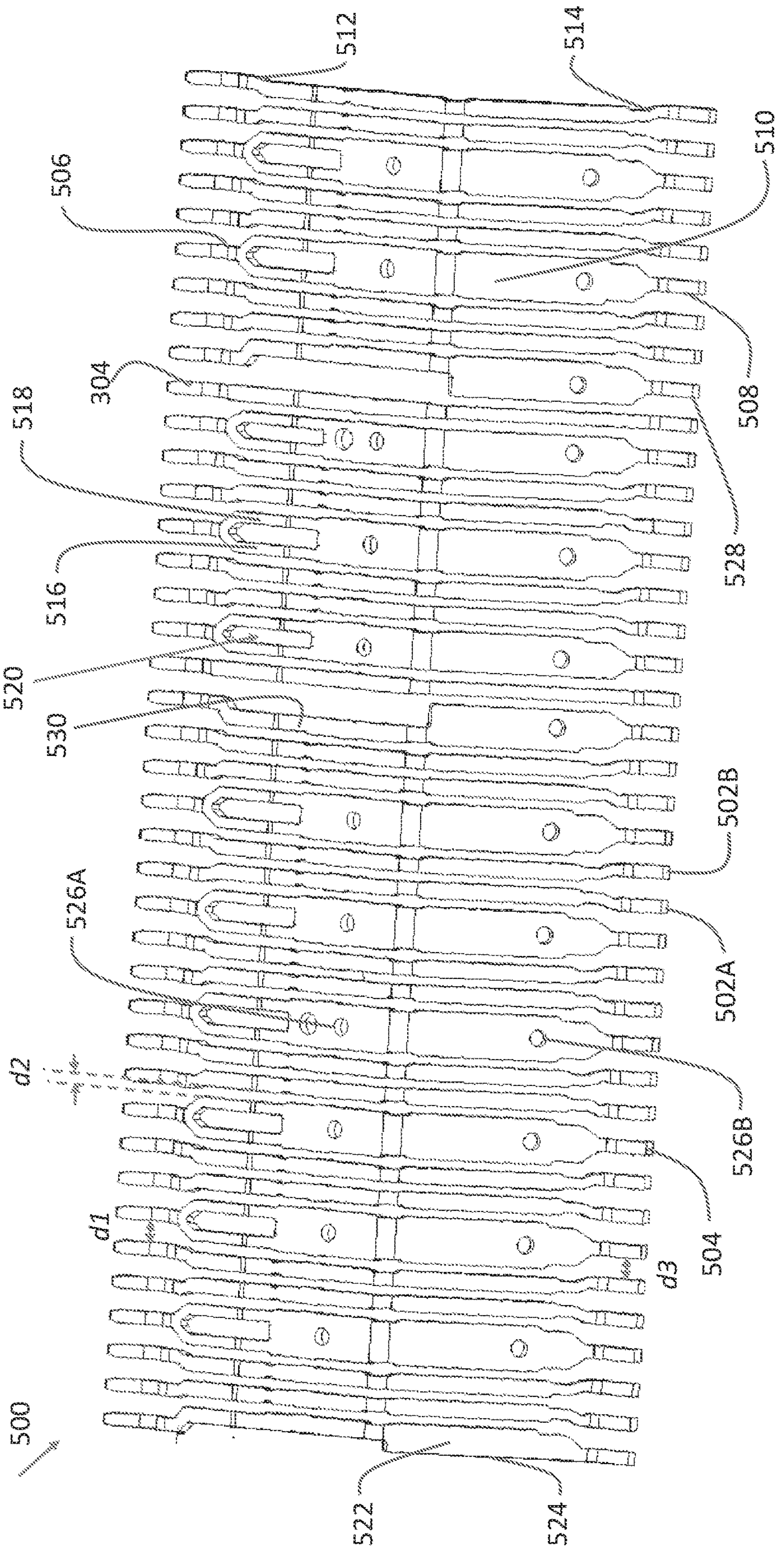
FIG. 5 is a top perspective view of a lead assembly of the connector subassembly of FIG. 3A.
Figure 9:
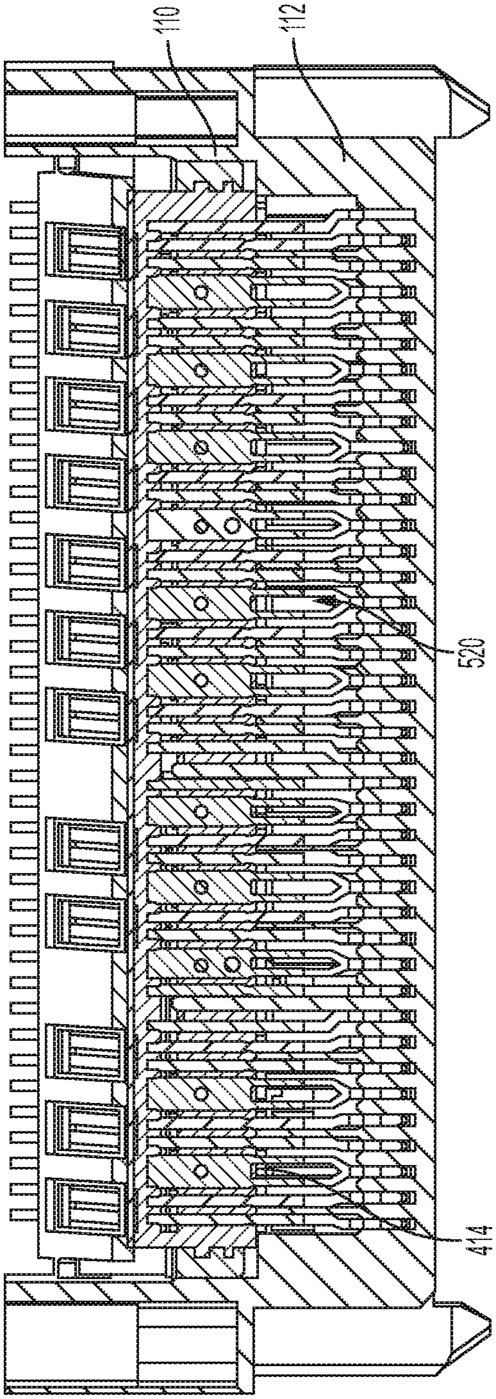
FIG. 9 is a cross-sectional perspective view of a portion of the receptacle connector of FIG. 1A along the line marked "9-9" in FIG. 1A.

Each connector subassembly may be at least partially inserted into one or more channels 120 of the connector housing 102. As shown in FIGS. 7-9, the connector subassembly 300 may be disposed into the connector housing 102 such that portions of the conductive elements in the connector subassembly 300 may line along the first wall 112, with contact portions 710 of the mating ends 506 curving into the slot 108. The intermediate portion 510 of a conductive element may include a fixed portion 702 disposed in the base portion 110 of the connector housing 102, an inside portion 704 lining along the first wall 112 of the connector housing 102, and an outside portion 706 extending out of the base portion 110 of the connector housing 102. For each ground conductor 504, the inside portion 704 of the intermediate portion 510 may consist of the first portion 516 and second portion 518 separated by the slot 520 (FIG. 5). The first edge 414 of the insulative member 402 may be disposed at the joint of the base portion 110 and the first wall 112 of the connector housing 102. As illustrated, the outside portions 706 of the intermediate portions 510 of the conductive elements may include a bend such that the contact surfaces of the mounting ends 508 are substantially parallel to the contact surfaces of the mating ends 506. The bend may extend in an angle $\alpha$, which may be an obtuse angle or a right angle.

Figure 4:
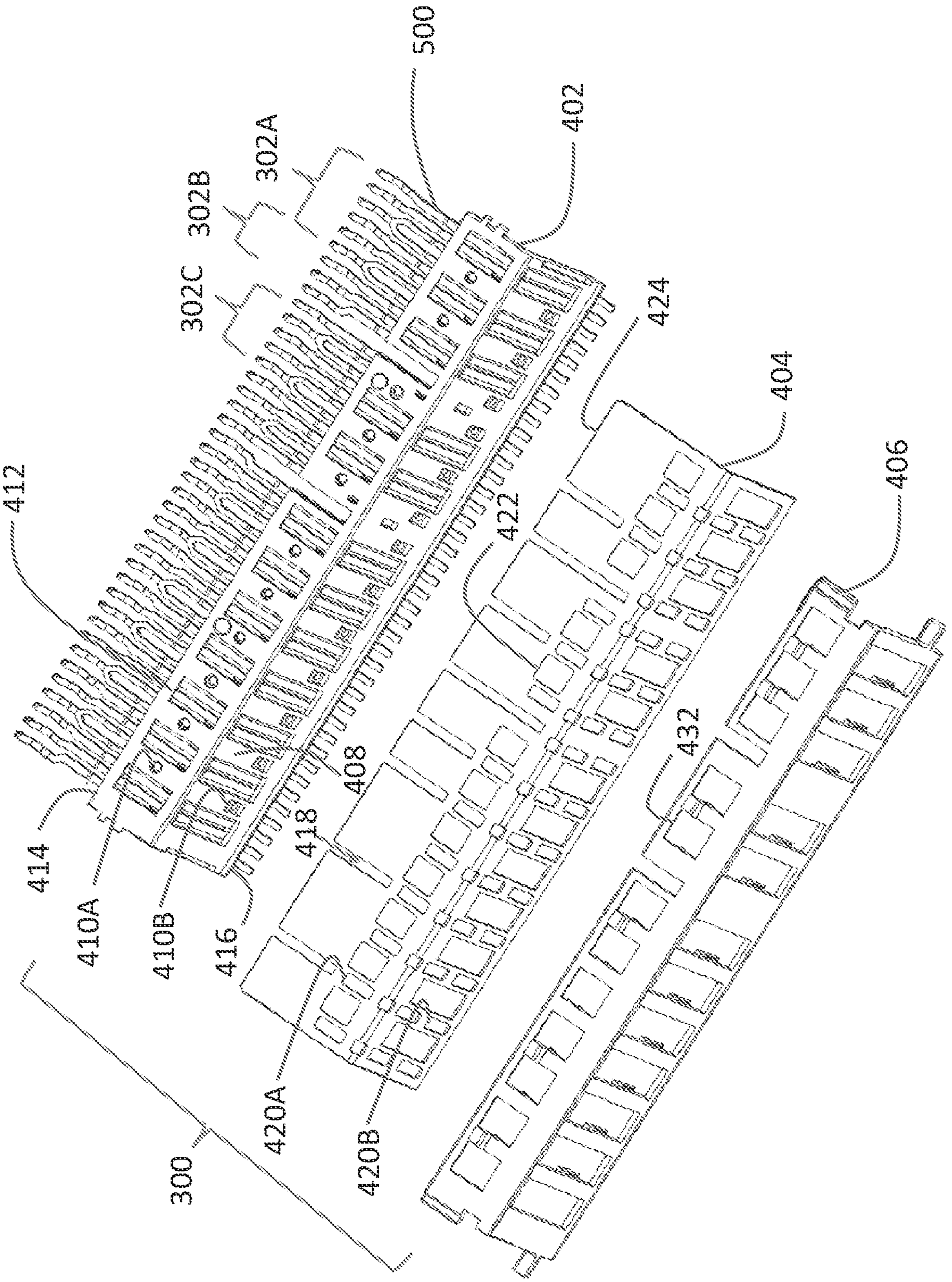
FIG. 4 is a partially exploded top perspective view of the connector subassembly of FIG. 3A.

The shielding member 404 of the connector subassembly 300 may include a first portion 802 disposed in the base portion 110 of the connector housing 102, a second portion 804 disposed in the first wall 112 of the connector housing 102, and a third portion 806 extending out of the base portion 110 of the connector housing 102. The second portion 804 of the shielding member 404 may include the parts 424 (FIG. 4). The first wall 112 of the connector housing 102 may have slots each for receiving one of the parts 424 of second portion 804 of the shielding member 404. This configuration separates the conductive elements from the shielding member 404 with the insulative material of the first wall and therefore prevents the signal conductors from shorting to the shielding member 404 when pushed by a mating component, improving the connector's high frequency performance while maintaining reliability.

As shown in FIG. 8, the connector subassembly 600 may be disposed into the connector housing 102 such that portions of the conductive elements in the connector subassembly 600 may line along the second wall 114. The conductive elements may each include a fixed portion 808 disposed in the base portion 110 of the connector housing 102, an inside portion 816 lining along the second wall 114 of the connector housing 102, and an outside portion 810 extending out of the base portion 110 of the connector housing 102. The outside portion 810 may include a first part 612 extending substantially perpendicular to the fixed portion 808 and a second part 614 joining the fixed portion 808 and the first part 612. For a ground conductor 604, the second part 614 may include an opening 610 such that the ground conductor 604 may be wider than a signal conductor but can be bent with a force of a similar magnitude.

The shielding member 202 of the connector subassembly 600 may be attached to an outside of the second wall 114 (also see FIG. 1B). The beams 204 of the shielding member 202 may extend through openings of the second wall 114 and into the slot 108. The beams 204 may each include a contact portion 814 configured to contact a distal end 812 of a respective one of the ground conductors 604 when the ground conductors 604 are pushed down by a mating component.

As illustrated, the mounting ends 818 of the conductive elements of the connector subassembly 600 may extend in the same direction as the mounting ends 508 of the conductive elements of the connector subassembly 300. This configuration enables the conductive elements to be shorter while satisfying a same footprint. The conductive elements of the connector subassembly 600 may be shorter than if the conductive elements with mating ends extending toward the connector housing 102 since the conductive elements may need to extend farther out of the base portion 110 of the connector housing 102 to provide the space for those mating ends to extend toward the connector. The conductive elements of the connector subassembly 300 may also be shorter since the conductive elements may need to extend farther out of the base portion 110 to be separated from the conductive elements of the connector subassembly 600 for a safe distance.

In some embodiments, housing components, such as the connector housing 102 and insulative members 402 and 608, may be dielectric members molded from a dielectric material such as plastic or nylon. Examples of suitable materials include, but are not limited to, liquid crystal polymer (LCP), polyphenyline sulfide (PPS), high temperature nylon or polyphenylenoxide (PPO) or polypropylene (PP). Other suitable materials may be employed, as aspects of the present disclosure are not limited in this regard.

In some embodiments, conductive elements such as signal conductors 502A, 502B, 304 and ground conductors 504, 528 may be made of metal or any other material that is conductive and provides suitable mechanical properties for conductive elements in an electrical connector. Phosphor-bronze, beryllium copper and other copper alloys are non-limiting examples of materials that may be used. The conductive elements may be formed from such materials in any suitable way, including by stamping and/or forming.

In some embodiments, lossy members such as lossy member 406, 606 may be made of materials that dissipate a sufficient portion of the electromagnetic energy interacting with that material to appreciably impact the performance of a connector may be regarded as lossy. A meaningful impact results from attenuation over a frequency range of interest for a connector. In some configurations, lossy material may suppress resonances within ground structures of the connector and the frequency range of interest may include the natural frequency of the resonant structure, without the lossy material in place. In other configurations, the frequency range of interest may be all or part of the operating frequency range of the connector.

For testing whether a material is lossy, the material may be tested over a frequency range that may be smaller than or different from the frequency range of interest of the connector in which the material is used. For example, the test frequency range may extend from 10 GHz to 25 GHz or 1 GHz to 5 GHz. Alternatively, lossy material may be identified from measurements made at a single frequency, such as 10 GHz or 15 GHz.

Loss may result from interaction of an electric field component of electromagnetic energy with the material, in which case the material may be termed electrically lossy. Alternatively or additionally, loss may result from interaction of a magnetic field component of the electromagnetic energy with the material, in which case the material may be termed magnetically lossy.

Electrically lossy materials can be formed from lossy dielectric and/or poorly conductive materials. Electrically lossy material can be formed from material traditionally regarded as dielectric materials, such as those that have an electric loss tangent greater than approximately 0.01, greater than 0.05, or between 0.01 and 0.2 in the frequency range of interest. The "electric loss tangent" is the ratio of the imaginary part to the real part of the complex electrical permittivity of the material.

Electrically lossy materials can also be formed from materials that are generally thought of as conductors, but are relatively poor conductors over the frequency range of interest. These materials may conduct, but with some loss, over the frequency range of interest such that the material conducts more poorly than a conductor of an electrical connector, but better than an insulator used in the connector. Such materials may contain conductive particles or regions that are sufficiently dispersed that they do not provide high conductivity or otherwise are prepared with properties that lead to a relatively weak bulk conductivity compared to a good conductor such as pure copper over the frequency range of interest. Die cast metals or poorly conductive metal alloys, for example, may provide sufficient loss in some configurations.

Electrically lossy materials of this type typically have a bulk conductivity of about 1 Siemen/meter to about 100,000 Siemens/meter, or about 1 Siemen/meter to about 30,000 Siemens/meter, or 1 Siemen/meter to about 10,000 Siemens/meter. In some embodiments, material with a bulk conductivity of between about 1 Siemens/meter and about 500 Siemens/meter may be used. As a specific example, material with a conductivity between about 50 Siemens/meter and 300 Siemens/meter may be used. However, it should be appreciated that the conductivity of the material may be selected empirically or through electrical simulation using known simulation tools to determine a conductivity that provides suitable signal integrity (SI) characteristics in a connector. The measured or simulated SI characteristics may be, for example, low cross talk in combination with a low signal path attenuation or insertion loss, or a low insertion loss deviation as a function of frequency.

It should also be appreciated that a lossy member need not have uniform properties over its entire volume. A lossy member, for example, may have an insulative skin or a conductive core, for example. A member may be identified as lossy if its properties on average in the regions that interact with electromagnetic energy sufficiently attenuate the electromagnetic energy.

In some embodiments, lossy material is formed by adding to a binder a filler that contains particles. In such an embodiment, a lossy member may be formed by molding or otherwise shaping the binder with filler into a desired form. The lossy material may be molded over and/or through openings in conductors, which may be ground conductors or shields of the connector. Molding lossy material over or through openings in a conductor may ensure intimate contact between the lossy material and the conductor, which may reduce the possibility that the conductor will support a resonance at a frequency of interest. This intimate contact may, but need not, result in an Ohmic contact between the lossy material and the conductor.

Alternatively or additionally, the lossy material may be molded over or injected into insulative material, or vice versa, such as in a two shot molding operation. The lossy material may press against or be positioned sufficiently near a ground conductor that there is appreciable coupling to a ground conductor. Intimate contact is not a requirement for electrical coupling between lossy material and a conductor, as sufficient electrical coupling, such as capacitive coupling, between a lossy member and a conductor may yield the desired result. For example, in some scenarios, 100 pF of coupling between a lossy member and a ground conductor may provide an appreciable impact on the suppression of resonance in the ground conductor. In other examples with frequencies in the range of approximately 10 GHz or higher, a reduction in the amount of electromagnetic energy in a conductor may be provided by sufficient capacitive coupling between a lossy material and the conductor with a mutual capacitance of at least about 0.005 pF, such as in a range between about 0.01 pF to about 100 pF, between about 0.01 pF to about 10 pF, or between about 0.01 pF to about 1 pF. To determine whether lossy material is coupled to a conductor, coupling may be measured at a test frequency, such as 15 GHz or over a test range, such as 10 GHz to 25 GHz.

To form an electrically lossy material, the filler may be conductive particles. Examples of conductive particles that may be used as a filler to form an electrically lossy material include carbon or graphite formed as fibers, flakes, nanoparticles, or other types of particles. Various forms of fiber, in woven or non-woven form, coated or non-coated may be used. Non-woven carbon fiber is one suitable material. Metal in the form of powder, flakes, fibers or other particles may also be used to provide suitable electrically lossy properties. Alternatively, combinations of fillers may be used. For example, metal plated carbon particles may be used. Silver and nickel are suitable metal plating for fibers. Coated particles may be used alone or in combination with other fillers, such as carbon flake.

Preferably, the fillers will be present in a sufficient volume percentage to allow conducting paths to be created from particle to particle. For example, when metal fiber is used, the fiber may be present in about 3% to 30% by volume. The amount of filler may impact the conducting properties of the material, and the volume percentage of filler may be lower in this range to provide sufficient loss.

The binder or matrix may be any material that will set, cure, or can otherwise be used to position the filler material. In some embodiments, the binder may be a thermoplastic material traditionally used in the manufacture of electrical connectors to facilitate the molding of the electrically lossy material into the desired shapes and locations as part of the manufacture of the electrical connector. Examples of such materials include liquid crystal polymer (LCP) and nylon. However, many alternative forms of binder materials may be used. Curable materials, such as epoxies, may serve as a binder. Alternatively, materials such as thermosetting resins or adhesives may be used.

While the above-described binder materials may be used to create an electrically lossy material by forming a binder around conducting particle fillers, lossy materials may be formed with other binders or in other ways. In some examples, conducting particles may be impregnated into a formed matrix material or may be coated onto a formed matrix material, such as by applying a conductive coating to a plastic component or a metal component. As used herein, the term "binder" encompasses a material that encapsulates the filler, is impregnated with the filler or otherwise serves as a substrate to hold the filler.

Magnetically lossy material can be formed, for example, from materials traditionally regarded as ferromagnetic materials, such as those that have a magnetic loss tangent greater than approximately 0.05 in the frequency range of interest. The "magnetic loss tangent" is the ratio of the imaginary part to the real part of the complex electrical permeability of the material. Materials with higher loss tangents may also be used.

In some embodiments, a magnetically lossy material may be formed of a binder or matrix material filled with particles that provide that layer with magnetically lossy characteristics. The magnetically lossy particles may be in any convenient form, such as flakes or fibers. Ferrites are common magnetically lossy materials. Materials such as magnesium ferrite, nickel ferrite, lithium ferrite, yttrium garnet or aluminum garnet may be used. Ferrites will generally have a loss tangent above 0.1 at the frequency range of interest. Presently preferred ferrite materials have a loss tangent between approximately 0.1 and 1.0 over the frequency range of 1 GHz to 3 GHz and more preferably a magnetic loss tangent above 0.5 over that frequency range.

Practical magnetically lossy materials or mixtures containing magnetically lossy materials may also exhibit useful amounts of dielectric loss or conductive loss effects over portions of the frequency range of interest. Suitable materials may be formed by adding fillers that produce magnetic loss to a binder, similar to the way that electrically lossy materials may be formed, as described above.

It is possible that a material may simultaneously be a lossy dielectric or a lossy conductor and a magnetically lossy material. Such materials may be formed, for example, by using magnetically lossy fillers that are partially conductive or by using a combination of magnetically lossy and electrically lossy fillers.

Lossy portions also may be formed in a number of ways. In some examples the binder material, with fillers, may be molded into a desired shape and then set in that shape. In other examples the binder material may be formed into a sheet or other shape, from which a lossy member of a desired shape may be cut. In some embodiments, a lossy portion may be formed by interleaving layers of lossy and conductive material such as metal foil. These layers may be rigidly attached to one another, such as through the use of epoxy or other adhesive, or may be held together in any other suitable way. The layers may be of the desired shape before being secured to one another or may be stamped or otherwise shaped after they are held together. As a further alternative, lossy portions may be formed by plating plastic or other insulative material with a lossy coating, such as a diffuse metal coating.

Although details of specific configurations of conductive elements and housings are described above, it should be appreciated that such details are provided solely for purposes of illustration, as the concepts disclosed herein are capable of other manners of implementation. In that respect, various connector designs described herein may be used in any suitable combination, as aspects of the present disclosure are not limited to the particular combinations shown in the drawings.

Having thus described several embodiments, it is to be appreciated various alterations, modifications, and improvements may readily occur to those skilled in the art.

For example, techniques as described herein may be embodied in card edge connectors or connectors configured only for high-speed signals.

As another example, high-speed and low-speed signal conductors may be configured the same, with signal conductors in the same row having the same shape. The high-speed and low-speed signal conductors nonetheless may be differentiated based on the ground structures and insulative portions around them. Alternatively, some or all of the high-speed signal conductors may be configured differently from low-speed signal conductors, even within the same row. The edge-to-edge spacing may be closer for high-speed signal conductors, for example.

As another example, connectors are illustrated that have mating locations and mounting locations that may be compatible with a PCIeSAS standard. Techniques as described herein may be used to increase the operating speed of connectors designed according to other standards.

Furthermore, techniques for increasing the operating speed of a connector, even when constrained by dimensions specified in an industry standard, are shown and described with reference to a receptacle connector, it should be appreciated that aspects of the present disclosure are not limited in this regard, as any of the inventive concepts, whether alone or in combination with one or more other inventive concepts, may be used in other types of electrical connectors, such as plug connectors, card edge connectors, backplane connectors, right angle connectors, stacking connectors, mezzanine connectors, I/O connectors, chip sockets, etc.

In some embodiments, mounting ends were illustrated as surface mount elements that are designed to fit within pads of printed circuit boards. However, other configurations may also be used, such as press fit "eye of the needle" compliant sections, spring contacts, solderable pins, etc.

Such alterations, modifications, and improvements are intended to be within the spirit and scope of the invention. Accordingly, the foregoing description and drawings are by way of example only.

All definitions, as defined and used, should be understood to control over dictionary definitions, definitions in documents incorporated by reference, and/or ordinary meanings of the defined terms.

Numerical values and ranges may be described in the specification and claims as approximate or exact values or ranges. For example, in some cases the terms "about," "approximately," and "substantially" may be used in reference to a value. Such references are intended to encompass the referenced value as well as plus and minus reasonable variations of the value.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. A connector subassembly, comprising:

an insulative member; and a plurality of conductive elements held by the insulative member, each of the plurality of conductive elements comprising a mating end, a mounting end opposite the mating end, and an intermediate portion joining the mating end and the mounting end, the plurality of conductive elements comprising pairs of signal conductors and ground conductors disposed between the pairs of signal conductors, wherein:

each of the ground conductors comprises a first portion and a second portion separated by an elongated slot until joining with each other at the mating end, and the insulative member comprises portions extending through the elongated slots of the ground conductors.

2. The connector subassembly of claim 1, wherein, for each of the ground conductors:

the elongated slot is shaped and sized such that the first portion and the second portion have uniform widths.

3. The connector subassembly of claim 1, wherein, for each of the ground conductors:

the elongated slot is shaped and sized such that the mating end can be displaced by a greater distance under a force of a same magnitude.

4. The connector subassembly of claim 1, wherein:

broadsides of the intermediate portions of the ground conductors are wider than broadsides of the intermediate portions of the signal conductors, and the elongated slots of the ground conductors are shaped and sized such that the mating ends of the ground conductors can be displaced by a similar distance as the mating ends of the signal conductors under a force of a same magnitude.

5. The connector subassembly of claim 4, wherein:

broadsides of the mating ends of the ground conductors have a same width as broadsides of the mating ends of the signal conductors.

6. The connector subassembly of claim 4, wherein:

broadsides of the mounting ends of the ground conductors have a same width as broadsides of the mounting ends of the signal conductors.

7. The connector subassembly of claim 1 wherein:

the mating ends of the plurality of conductive elements are separated from each other by a first distance, the intermediate portions of the plurality of conductive elements are separated from each other by a second distance, and each of the plurality of conductive elements comprises a first transition portion joining the mating end and the intermediate portion such that the first distance is greater than the second distance; and a second transition portion joining the mounting end and the intermediate portion such that the mounting ends of the plurality of conductive elements are separated from each other by the first distance.

8. The connector subassembly of claim 1, comprising:

a shielding member stacked on the insulative member and comprising a plurality of slots at least partially overlapping with slots of selected ones of the ground conductors.

9. The connector subassembly of claim 8, wherein:

the shielding member extends to the mating ends of the plurality of conductive elements.

10. An electrical connector, comprising:

a housing comprising a base portion, first and second walls extending from the base portion and separated by a slot;

a plurality of conductive elements coupled to the first wall and held by an insulative member, each of the plurality of conductive element comprising a mating end curving into the slot, a mounting end opposite the mating end, and an intermediate portion joining the mating end and the mounting end, wherein, for each of the plurality of conductive elements:

the intermediate portion comprises a first portion disposed in the base portion of the housing, and a second portion extending from the first portion into a channel of the first wall of the housing, and the second portion comprises an opening elongating along a length of the second portion until the mating end; and a shielding member stacked on the insulative member and comprising a plurality of openings at least partially overlapping with openings of selected ones of the plurality of conductive elements.

11. The electrical connector of claim 10, wherein, for each of the plurality of conductive elements:

the intermediate portion comprises a third portion extending from the first portion and out of the base portion of the housing.

12. The electrical connector of claim 11, wherein, for each of the plurality of conductive elements:

the third portion of the intermediate portion comprises a bend extending in an obtuse angle.

13. The electrical connector of claim 10, wherein:

the plurality of conductive elements are a plurality of ground conductors, and the electrical connector comprises a plurality of signal conductors disposed between the ground conductors.

14. The electrical connector of claim 13, wherein:

individual signal conductors are narrower than individual ground conductors.

15. The electrical connector of claim 10, wherein:

the plurality of conductive elements are a first plurality of conductive elements, the electrical connector comprises a second plurality of conductive elements coupled to the second wall, the second plurality of conductive element each comprising a mating end comprising a contact portion curving into the slot, a mounting end opposite the mating end, and an intermediate portion joining the mating end and the mounting end, wherein, for each of the second plurality of conductive elements:

the intermediate portion comprises a first portion disposed in the base portion of the housing, and a second portion extending from the first portion and out of the base portion of the housing, and the second portion comprises an opening.

16. The electrical connector of claim 15, wherein, for each of the second plurality of conductive elements:

the second portion of the intermediate portion comprises a first part extending perpendicular to the first portion, and a second part joining the first part and the first portion, and the opening is disposed at the second part.

17. The electrical connector of claim 15, wherein:

the mounting ends of the first plurality of conductive elements extend from respective intermediate portions and away from the mounting ends of the second plurality of conductive elements, and the mounting ends of the second plurality of conductive elements extend from respective intermediate portions and towards the mounting ends of the first plurality of conductive elements.

* * * * *